United States Patent Office 3,447,454
Patented June 3, 1969

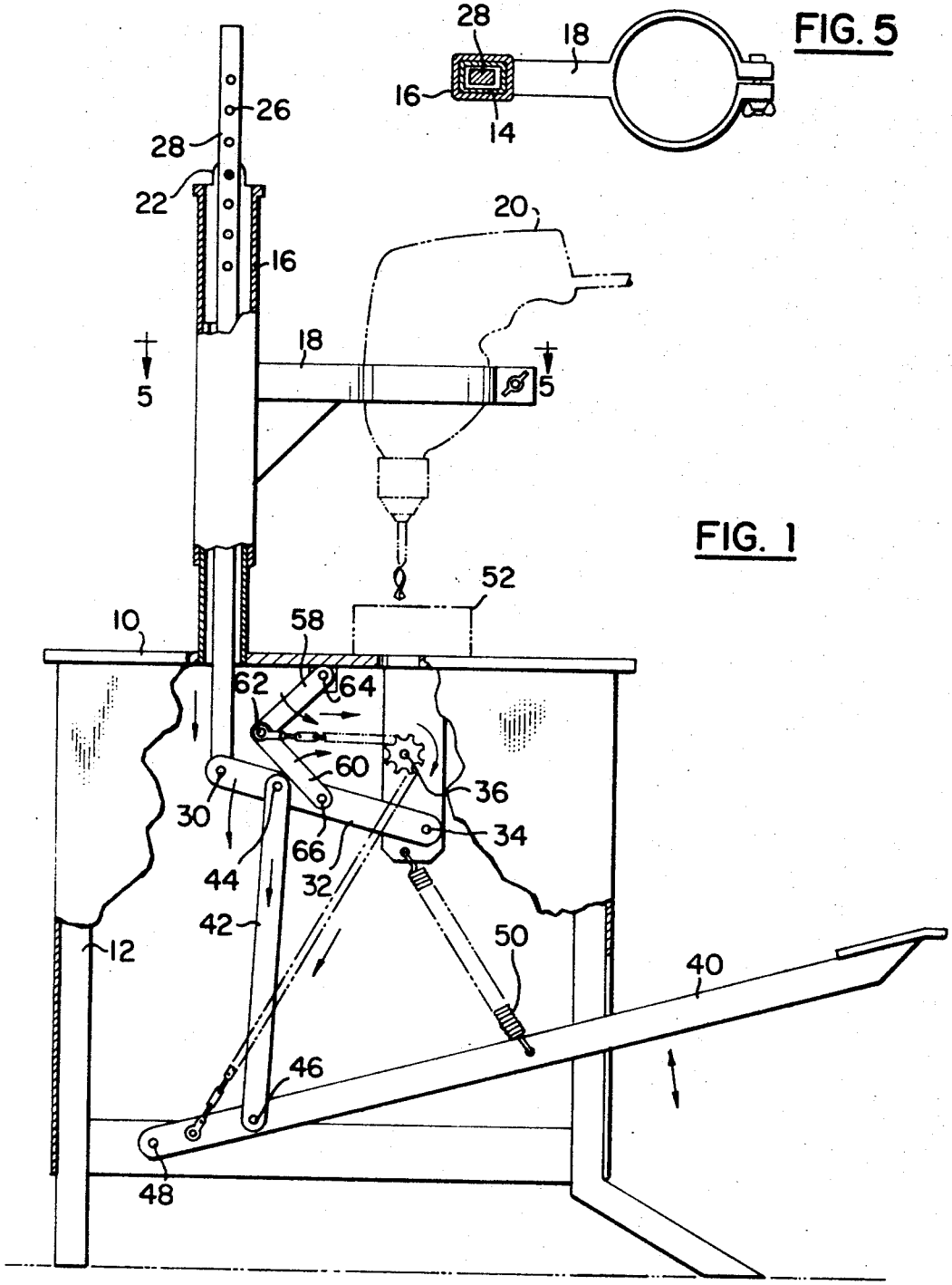

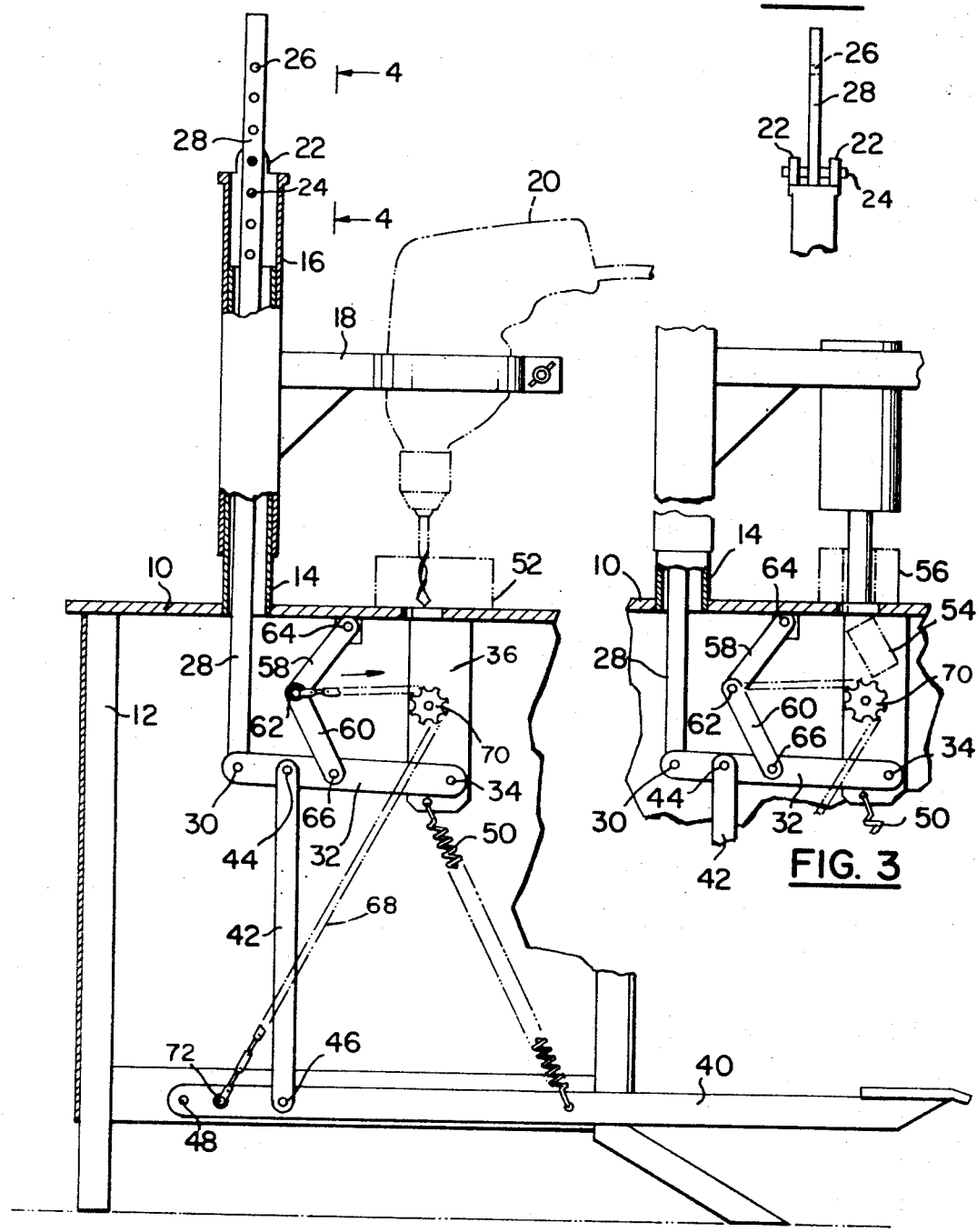

3,447,454
MACHINE TOOL OPERATING MECHANISM
Michael Ratz, 2956 Tyson Ave.,
Philadelphia, Pa. 19149
Filed Aug. 24, 1967, Ser. No. 667,316
Int. Cl. B23b 45/14; B26d 5/08
U.S. Cl. 100—266           2 Claims

ABSTRACT OF THE DISCLOSURE

A compact mechanism for presenting a machine tool to a work piece with controlled pressure, with a linkage system for multiplying the pressure exerted by the operator.

---

Machine tools, such as a drill or similar tool which is manually movable toward, and away from, the work with controlled pressure, are known. But, as far as I am concerned, in all such machines, the pressure applied to the tool is that exerted by the operator. Such pressure is enough for boring, drilling, or other cutting operations, but is insufficient for other operations where great force is needed such as for driving a tight-fitting bushing out of a sleeve, or collar, or for other applications, requiring similar great force.

The object of this invention is to produce a mechanism of the type set forth wherein the pressure applied by the operator is multiplied.

A further object is to produce a machine tool operating mechanism of the type set forth wherein the pressure-multiplying mechanism is incorporated in otherwise conventional operating linkage with minimum addition to the cost and weight, and without any increase in overall dimensions.

In the drawings:

FIG. 1 is a view, partly in elevation and partly in section, of a machine tool operating mechanism embodying the invention, the same being shown at rest, that is, when not in use.

FIG. 2 is the same as FIG. 1 except that it shows the apparatus in use as a drill.

FIG. 3 is a fragmentary view showing the apparatus in use as a punch, driving out a bushing.

FIG. 4 is an elevational view looking in the direction of line 4—4 on FIG. 2.

FIG. 5 is a sectional view looking in the direction of line 5—5 on FIG. 1.

The workbench illustrated includes a working top 10 which is carried by legs 12 and carries a fixed guide 14 which is preferably tubular in cross section. Sliding on guide 14 is a sleeve 16 which carries a vise 18 for clamping a machine tool, such as an electric drill 20. Sleeve 16 has ears 22 for receiving a pin 24 which also passes through one of the holes 26, which are formed in operating rod 28 to limit the movement of said rod and of tubular member 16 relative to fixed sleeve 16. It will be noted that this also limits the movement of the drill relative to working top 10.

The lower end of rod 28 is pivoted, as at 30, to one end of an operating link 32, the other end of which is pivoted at 34 to fixed bracket 36, or to a portion of the frame or any other fixed support. Operating rod 28 is connected to actuating pedal 40, by a connecting rod 42, the upper end of which is pivoted at 44, to link 32 and the lower end of which is pivoted at 46, to foot pedal 40. The inner end of pedal 40 is pivoted as, at 48, to a fixed support and its outer end is adapted to receive the foot of the operator. The pedal is normally biased to the position of FIG. 1 by a spring 50.

The operation is as follows:

To drill a workpiece 52, sleeve 16 is adjusted to desired height to permit placement of the workpiece therebelow, and pressure is applied to the foot pedal to bring the drill down on the workpiece with the requisite pressure.

For ordinary purposes, the pressure exerted by the foot pedal is sufficient but, for driving a bushing 54 out of a sleeve 56, as in FIG. 3, or for other uses where greatly increased pressure is needed, I provide links 58 and 60 the adjacent ends of which are connected by a pivot 62 to form the knee of a toggle. The other end of link 58 is pivoted at 64, to working top 10 or other fixed support, and the other end of link 60 is pivoted at 66, to link 32. Connected to pivot 62 is one end of a chain 68 which passes over sprocket 70 and the other end of which is connected, at 72, to pedal 40 at a point close to pivot 48. Obviously, pressure on pedal 40 exerts a pull on pivot 62 in the direction of the arrows in FIGS. 1 and 2. This pull tends to increase the angle between links 58 and 60. The movement of pivot 62 is translated into downward pressure by link 60 on operating link 32. This pressure is in addition to the downward pressure which would be exerted in the absence of links 58 and 60.

In order to provide for a sufficient range of movement of rod 28, and, hence, of the drill, or other tool 20, pivot 46 must be at some distance from pivot 48. But, the farther pivot 46 is from pivot 48, the less the effective pressure, or pull, exerted by a given force applied at the far end of the pedal. The problem therefore is how to obtain the increased pressure against the work piece for a given vertical adjustment of rod 28. In other words, if the apparatus is adjusted to give the drill a four inches vertical movement, the problem is to increase the pressure exerted, without decreasing the range of vertical movement. For example, let it be assumed that the position of pivot 46 is such that the drill can be moved 4 inches up or down. Let it be further assumed that X downward force applied to the outer end of the pedal, in the absence of links 58 and 60 will cause the drill, or other tool, to exert Y pressure on the workpiece. Now, if links 58 and 60 are added and if the chain is connected to the pedal at, or just to the right of point 46, there will be no increase in the resultant effective force. But, by connecting the chain, as shown, or to the left of pivot 46, the force exerted will be that which would be available were rod 42 itself pivoted to the pedal that much closer to fulcrum point 48. It is thus clear that the arrangement described increases the effective pressure of the tool on the workpiece for any given range of vertical movement of the tool.

What I claim is:
1. A tool operating mechanism including:
a frame,
a fixed supporting platform carried by said frame,
a vertically movable arm mounting a selected tool above said platform,
a foot lever below said platform,
pivot means connecting to inner end of said lever to said frame to provide a fulcrum for said lever,
a first linkage system connecting the lower end of said arm to said foot lever at a first point spaced outwardly from said pivot means whereby, when depressed, said foot lever depresses said arm and said tool with a force which is a function of the distance between said first pivot point and said fulcrum,
a spring normally biasing said foot lever and said tool upwardly,
a second linkage system connected to said platform and to said first linkage system, and
power transmitting means connecting said second linkage to said foot lever at a second point between said first point and said fulcrum whereby, depression of said foot lever actuates said second linkage system in a direction to exert a downward force on said first linkage system which is a function of the distance between said second point and said fulcrum.

2. A machine tool operating mechanism including:
a supporting frame,
a platform carried by an upper portion of the frame,
a vertically movable arm mounting a machine tool above said platform,
a foot lever,
pivot means connecting the inner end of said foot lever to a portion of said frame below said platform to provide a fulcrum,
a substantially horizontal link pivoted, at one end thereof, to an upper portion of the frame and pivoted, at the other end thereof, to the lower portion of said arm,
a substantially vertical link pivoted, at its upper end, to the end of said horizontal link adjacent said arm and pivoted, at its lower end, to said foot lever at a point spaced outwardly from said fulcrum,
a toggle having one arm thereof secured to said frame and, its other arm secured to said horizontal link, and
a flexible element connected, at one end thereof, to the knee of the toggle and, at its other end, to said foot lever at a point intermediate said fulcrum and the pivoted connection of the lower end of said vertical link with said foot lever whereby, depression of said foot lever pulls the knee of the toggle outwardly and causes the toggle to exert a downward pressure against said horizontal link.

References Cited

UNITED STATES PATENTS

| | | | |
|---|---|---|---|
| 965,087 | 7/1910 | Covey | 100—283 XR |
| 1,293,181 | 2/1919 | Parker | 100—283 XR |
| 1,306,571 | 6/1919 | Abele | 100—293 XR |
| 1,388,201 | 8/1921 | Price | 100—283 XR |
| 1,516,369 | 11/1924 | Wilson | 100—266 XR |
| 1,598,252 | 8/1926 | Platt | 100—266 XR |

BILLY J. WILHITE, *Primary Examiner.*

U.S. Cl. X.R.

29—251; 77—5; 83—633; 100—283, 293